United States Patent [19]

Kumashiro

[11] Patent Number: 5,341,227
[45] Date of Patent: Aug. 23, 1994

[54] DOT IMAGE DISCRIMINATION CIRCUIT FOR DISCRIMINATING A DOT IMAGE FROM OTHER TYPES OF IMAGES

[75] Inventor: Hideo Kumashiro, Toyokawa, Japan
[73] Assignee: Minolta Camera Kabushiki Kaisha, Osaka, Japan
[21] Appl. No.: 34,900
[22] Filed: Mar. 22, 1993
[30] Foreign Application Priority Data
  Mar. 23, 1992 [JP] Japan .................. 4-064601
[51] Int. Cl.$^5$ .................. H04N 1/40; H04N 1/46
[52] U.S. Cl. .................. 358/533; 358/462; 382/9
[58] Field of Search ............ 358/456, 462, 454, 458, 358/465, 466, 463, 464, 448, 532, 533, 530; 382/9, 22, 54

[56] References Cited
U.S. PATENT DOCUMENTS
4,722,008 1/1988 Ibaraki et al. .................. 358/456
5,193,122 3/1993 Kowalski et al. .................. 382/9

Primary Examiner—Edward L. Coles, Sr.
Assistant Examiner—Scott A. Rogers
Attorney, Agent, or Firm—Willian Brinks Hofer Gilson & Lione

[57] ABSTRACT

In a dot image discrimination circuit, a dot image in an area composed of many multi-tone pixels including a central pixel is discriminated. A pixel (change point) at which the density of the image data is prominent in a first direction is detected in a plurality of pixels. Then, it is inspected if change points exist continuously in a second direction perpendicular to the first direction. The change points are counted in an area of a prescribed size around the central pixel, but some change points existing continuously in the second direction are not counted. Thus, a pixel in an image made of regular dots can be discriminated from a pixel in another type of image such as a character image. The discrimination of a dot image can be performed fast and precisely.

16 Claims, 10 Drawing Sheets

Fig. 5(a) NOISE IMAGE

Fig. 5(b) PHOTOGRAPH IMAGE

Fig. 5(c) CHARACTER IMAGE

Fig. 5(d) DOT IMAGE

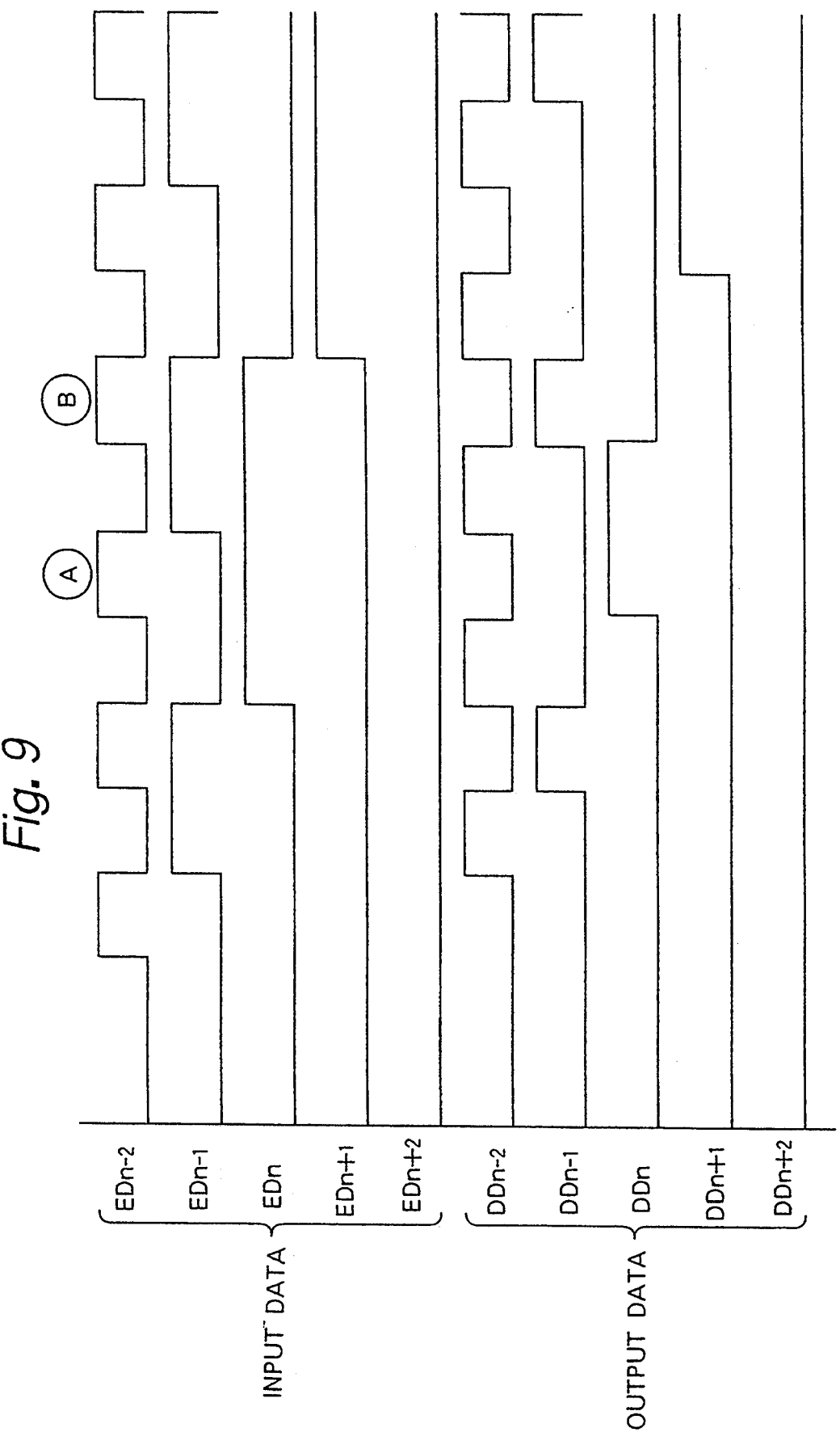

Fig. 11

| | CHARACTER IMAGE | DOT IMAGE |
|---|---|---|
| INPUT IMAGE DATA | (a) | (d) |
| MAXIMUM DETECTION FLAG | (b) NUMBER OF FLAGS=16 | (e) NUMBER OF FLAGS=29 |
| DETECTION FLAG AFTER REMOVING CONTINUOUS POINTS IN SUBSCAN DIRECTION | (c) NUMBER OF FLAGS=6 | (f) NUMBER OF FLAGS=22 |

DOT IMAGE DISCRIMINATION CIRCUIT FOR DISCRIMINATING A DOT IMAGE FROM OTHER TYPES OF IMAGES

BACKGROUND OF THE INVENTION

1. Field of the Invention

The present invention relates to a circuit for discriminating a dot image area from digital image data of a document read by a facsimile apparatus or the like.

2. Description of the Prior Art

Most prints of a half-tone image and of a color image available today include a dot image photograph. A dot image is composed of dots arranged regularly and usually it has various spatial frequencies. When such a dot image is read with an image sensor in a digital copying machine, a facsimile apparatus or the like, if the fundamental and a higher harmonic frequency of the dots in a dot image is similar to the sampling frequency of an image sensor used for reading the dot image, a beat of a low frequency happens and it can be detected with naked eyes. This is a sampling Moire pattern which degrades the image quality. Further, especially for a facsimile apparatus, if the frequency of the dots is higher than the sampling frequency, the gradation of the read image data may be changed largely each pixel and this decreases the compression ratio remarkably when an ordinary coding method suitable for a character image is used.

In order to solve this problem, high frequency components have to be reduced by smoothing the dot image data. However, for an image composed of both a dot image and a character image, the smoothing is performed even on the character image. Thus, the resolution in the character image area decreases to degrade the image quality.

Therefore, a method was proposed to discriminate a dot image area from a character image area in order to change the processing according to the discrimination of a dot image area and a character image area. For example, in an apparatus disclosed in Japanese Patent laid open Publication No. 194,968/1986, the number of change points, at which the density level changes largely, is counted in successive pixels in a block of pixels both in the main scan direction and in the subscan direction, and a dot image area is discriminated according to the sum of the count values in each block.

However, this method needs two independent counters for counting change points both in the main scan direction and in the subscan direction, in order to discriminate dots from characters having lines extending in the subscan direction correctly. Therefore, it is difficult to process at a fast rate and to reduce the cost simultaneously.

SUMMARY OF THE INVENTION

An object of the present invention is to provide a dot image discrimination circuit which can discriminate a dot image by using only one counter for change points.

In a dot image discrimination circuit according to the present invention, a dot image in an area composed of many multi-tone pixels including a central pixel is discriminated. A pixel at which the level of the image data is prominent in a first direction is detected in a plurality of pixels. Such a pixel is denoted as a change point. Then, it is inspected if change points exist continuously in a second direction perpendicular to the first direction. Next, the change points are counted in an area of a prescribed size around the central pixel. In the counting, some change points existing continuously in the second direction are not counted. Though the number of change points may be large for a dot image as well as for a character image, continuous charge points do not exist for a character image. Then, this invalidation of charge points makes it possible to discriminate a pixel in a dot image from that in other types of images.

An advantage of the present invention is that the discrimination of a dot image can be performed fast and precisely.

Another advantage of the present invention is that the processing of the image data can be adjusted according to the discrimination on the kind of the image.

BRIEF DESCRIPTION OF THE DRAWINGS

These and other objects and features of the present invention will become clear from the following description taken in conjunction with the preferred embodiments thereof with reference to the accompanying drawings, and in which:

FIG. 9 is a timing chart of the input signal $ED_n$ and the output signal $DD_n$ in the remover circuit;

FIG. 11 is a diagram of the processing in the dot image discrimination circuit for a character/dot image when the signal MSIZE="0".

DETAILED DESCRIPTION OF THE PREFERRED EMBODIMENTS

Figure 1:
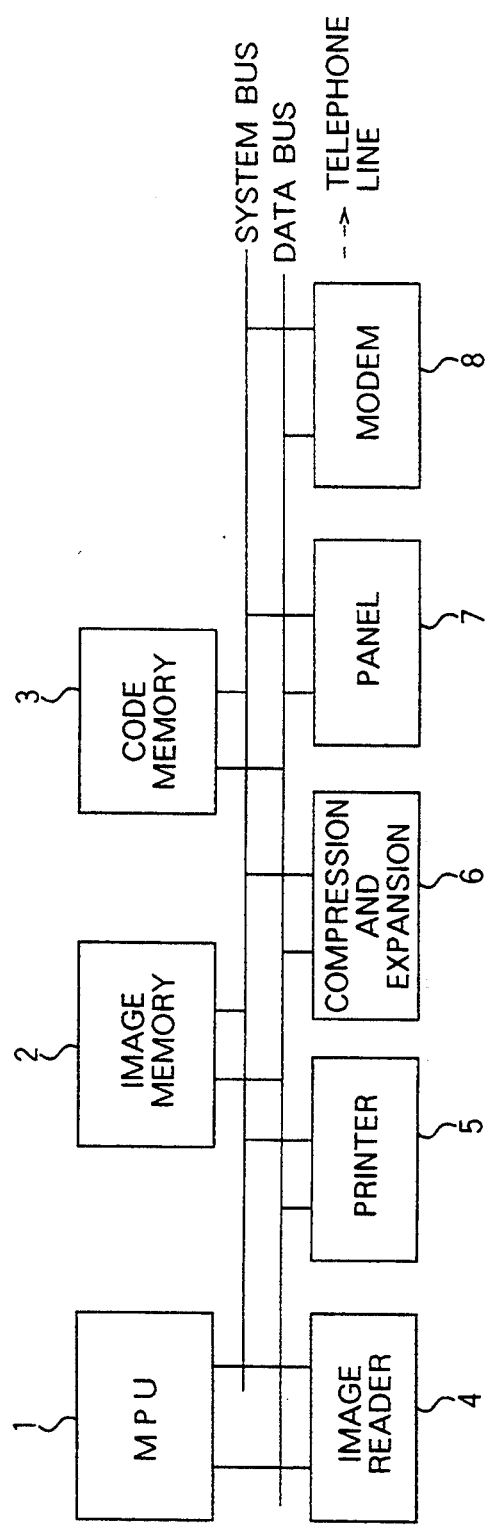
FIG. 1 is a block diagram of a facsimile apparatus.

Referring now to the drawings, wherein like reference characters designate like or corresponding parts throughout the several views, an embodiment of the present invention will be explained below in the following order:

(a) Structure of a facsimile apparatus
(b) Structure of image reader
(c) Dot area discriminator
   (c-1) Basic concept of dot area discrimination
   (c-2) Entire structure of dot image discriminator
   (c-3) Maximum detector
   (c-4) Remover circuit
   (c-5) Latch and decoder, and adder
   (c-6) Example of the detection of the degree of dot image

(a) Structure of a Facsimile Apparatus

FIG. 1 shows a basic structure of a facsimile apparatus. A dot area discriminator 12 (FIG. 2) is installed for example in an image reader 4. The facsimile apparatus consists of a microprocessor unit (MPU) 1 for controlling the entire apparatus, a panel 7 for a user to operate the apparatus, the image reader 4 for reading an image of a document put on a platen (not shown), an image memory 2 for storing the image data of the document, a compression and expansion section 6 for converting code data to image data or image data to code data, a code memory 3 for storing code data, a MODEM 8 for transmitting or receiving code data, and a printer 5 for printing a received facsimile message.

When a user sends a document to another party designated by the user, the document is set on the platen in the facsimile apparatus, and an image data is read with the image reader 4 by operating the panel 7. The image data is stored in the image memory 2 first. Then, the image data is converted to code data by the compression and expansion section 6 to be stored in the code memory 3. Next, the code data is sent via the MODEM 8 at prescribed timings to a telephone line to the other party.

When a facsimile message is received, the code data received via the MODEM 8 is stored first in the code memory 3. Then, the code data is converted to image data by the compression and expansion section 6 to be stored in the image memory 2. Next, the image data is sent to the printer 6 to print the message on a sheet of paper.

(b) Structure of Image Reader

Figure 2:
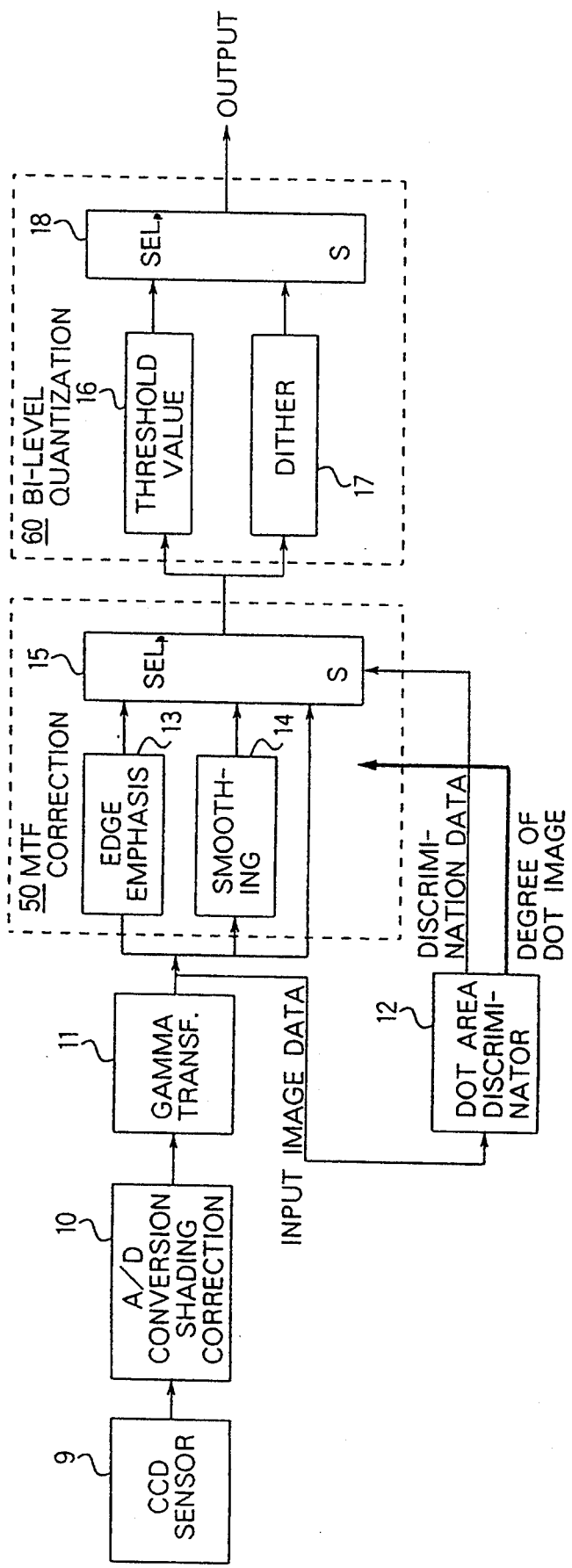
FIG. 2 is a block diagram of an image reader shown in FIG. 1.

As shown in FIG. 2, the image reader 4 consists of a CCD sensor 9 for reading image data of a document, an A/D conversion and shading correction circuit 10, a gamma transformation circuit 11, an MTF correction section 50 including an edge emphasis circuit 13, a smoothing circuit 14, and a selector 15, a bi-level quantization section 60 including a threshold value quantization circuit 16, a dither quantization circuit 17 and a selector 18, and a dot area discriminator 12 according to the present invention.

An optical image of a document put on the platen (not shown) is converted into electrical signals with the photoelectric conversion by the CCD sensor 9. Then, the signals are corrected by the A/D conversion and shading correction circuit 11 to provide digital image signals. The digital image signals of reflectivity data are converted by the gamma transformation circuit 11 to multi-level density data. The converted density data is corrected on the spatial frequency characteristics by the edge emphasis circuit 13 and by the smoothing circuit 14. The selector 15 mixes the image data corrected by the edge emphasis circuit 13 and the smoothing circuit 14 with the as-received image data at a prescribed mixing ratio, according to data on the discrimination received from the dot area discriminator 12.

The multi-level image data sent from the selector 15 is converted to bi-level data by the threshold value quantization circuit 16 with a simple threshold value or by the dither quantization circuit 17 suitable for a half tone image. The selector 18 selects the bi-level image data sent from the threshold value quantization circuit 16 or from the dither quantization circuit 17.

The bi-level data selected by the selector 18 is stored in the image memory 2 (FIG. 1) and converted to code data by the compression and expansion section 6 and the code data is stored in the code memory 3. Then, the code data is sent via the MODEM 8 to a telephone circuit. A series of the above-mentioned data processing is controlled by the MP 1 according to the operation with the panel 7.

When a dot image is quantized with a dither method in the hi-level quantization circuit 60, it is known that a Moire pattern due to the dither method happens if the spacial frequency of the dot image is similar to that of dither texture. The Moire pattern is very bad for the image quality. In order to prevent such Moire patterns, the dot area discriminator 12 processes image data of a block of 15 * 5 pixels and sends data on the degree of dot image to the MTF correction section 50. It also discriminates for each central pixel if it is a pixel in a dot area, and sends the result as discrimination data to the MTF correction section 50.

The MTF correction section 50 changes the mixing ratio of the three image data received from the edge emphasis circuit 13, the smoothing circuit 14 and the gamma transformation circuit 11 according to the discrimination data. The mixing ratio is set at an appropriate value by considering the contents of the smoothing and edge emphasis and the taste of a user. Table 1 shows examples of the mixing ratio of three image data, that is, the image data subjected to the edge emphasis by the edge emphasis circuit 13, the image data subjected to the smoothing by the smoothing circuit 14 and the original image data.

TABLE 1

| kind of image data | Mixing ratio in the MTF correction | | |
|---|---|---|---|
| | edge emphasis | smoothing | original image data |
| dot area | 0% | 50% | 50% |
| other areas | 33% | 33% | 34% |

Table 1 deals with an image wherein a character image and a photograph image are mixed. The smoothing is processed weakly in areas other than dot area to correct noises generated in the A/D conversion and the like in the image processing. In the above-mentioned examples, the mixing ratio is changed between the dot area and areas other than the dot area. Further, the mixing ratio can be controlled more finely according to the data of the degree of dot area received from the dot area discriminator 12 for a dot area. Still further, the discrimination data and the data of the degree of dot area may also be provided from the dot area discriminator 12 to the bi-level quantization section 60 to control the selector 18.

By using the above-mentioned processing, even for an image mixed with character and dot images, the resolution of the data in the character image area is not degraded by smoothing, while only the data in the dot image area is smoothed to suppress Moire patterns. Thus, a hi-level quantization image of good quality can be obtained.

(c) Dot Area Discriminator (c-1) Basic Concept of Dot Area Discrimination

The basic concept of the image area discrimination according to the present invention is described below. The discrimination of a dot area uses the three following characteristics of a dot image:

First, a dot image does not have spatial continuity because it consists of very small discrete dots arranged regularly. On the contrary, a character image and a photograph image are continuous spatially.

Second, a sharp density change arises in a local scale in the unit of pixel in a dot image. A sharp density change may also happen in a character image, but it does not happen in a photograph image.

Third, the above-mentioned second characteristic arises frequently in the local scale. This is a feature for a dot image.

By using the three characteristics of image data, a dot area can be discriminated from other types of images by using the following three steps:

In Step 1, a change point is detected at which the density data is prominent locally against those of peripheral pixels in the main scan direction, according to the abovementioned first and second characteristics. The change point is a pixel (maximum point) at which the density level changes more than a certain value between the object pixel and peripheral pixels, and which is used as a change point in this embodiment. In a photograph image and in a character image having many lines extending in the main scan direction, the density level is continuous spatially, and discrete maximum points are hard to detect. Therefore, an image area having many discrete maximum points is decided to probably be a dot area. (The above-mentioned change points may also be determined as pixels which have density levels exceeding a prescribed value.)

However, for a character image having many lines extending in the subscan direction, the number of maximum points in the main scan direction may be as large as those for a dot image. Thus, precise decision is not possible only by using the first characteristic. Previously, maximum points are also detected in the subscan direction, whereas in the present embodiment, Step 2 is performed for the maximum points in the subscan direction and the detection of maximum points in the subscan direction is not needed.

In Step 2, if maximum points detected in Step 1 exist continuously at specified distances in the same line in the subscan direction, the image is decided to be a part of a character image, and the relevant maximum points are deleted from the result to reduce the number of maximum points or to count only discrete maximum points. Further, the abovementioned maximum points existing continuously at specified distances may be maximum points aligned in a prescribed pattern or dots aligned alternately.

In Step 3, the maximum points in the specified image area finally remaining are counted. According to the third characteristic of a dot image, the number of maximum points is much larger than in a photograph image or in a character image. Thus, the number of the maximum points can be used as the degree of dot image, and it is sent to the MTF correction section 50. On the other hand, it is also decided if the image is a dot image or not by using a prescribed threshold value, and the result is sent to the MTF correction section 50.

An embodiment of the above-mentioned dot area discrimination is explained below as a dot area discriminator 12.

(c-2) Entire Structure of Dot Image Discriminator

Figure 3:
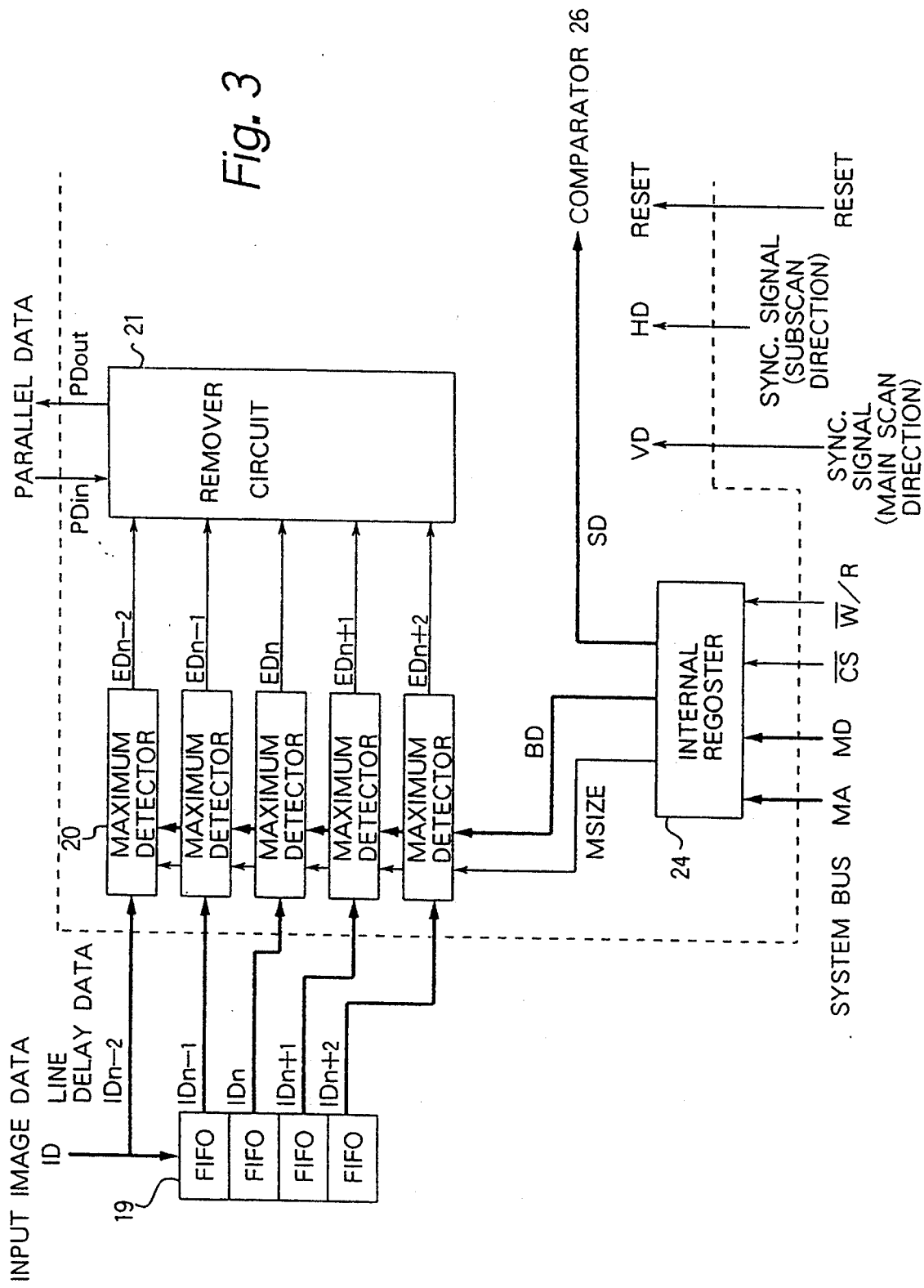
FIG. 3 is a block diagram of a part of a dot area discriminator.
Figure 4:
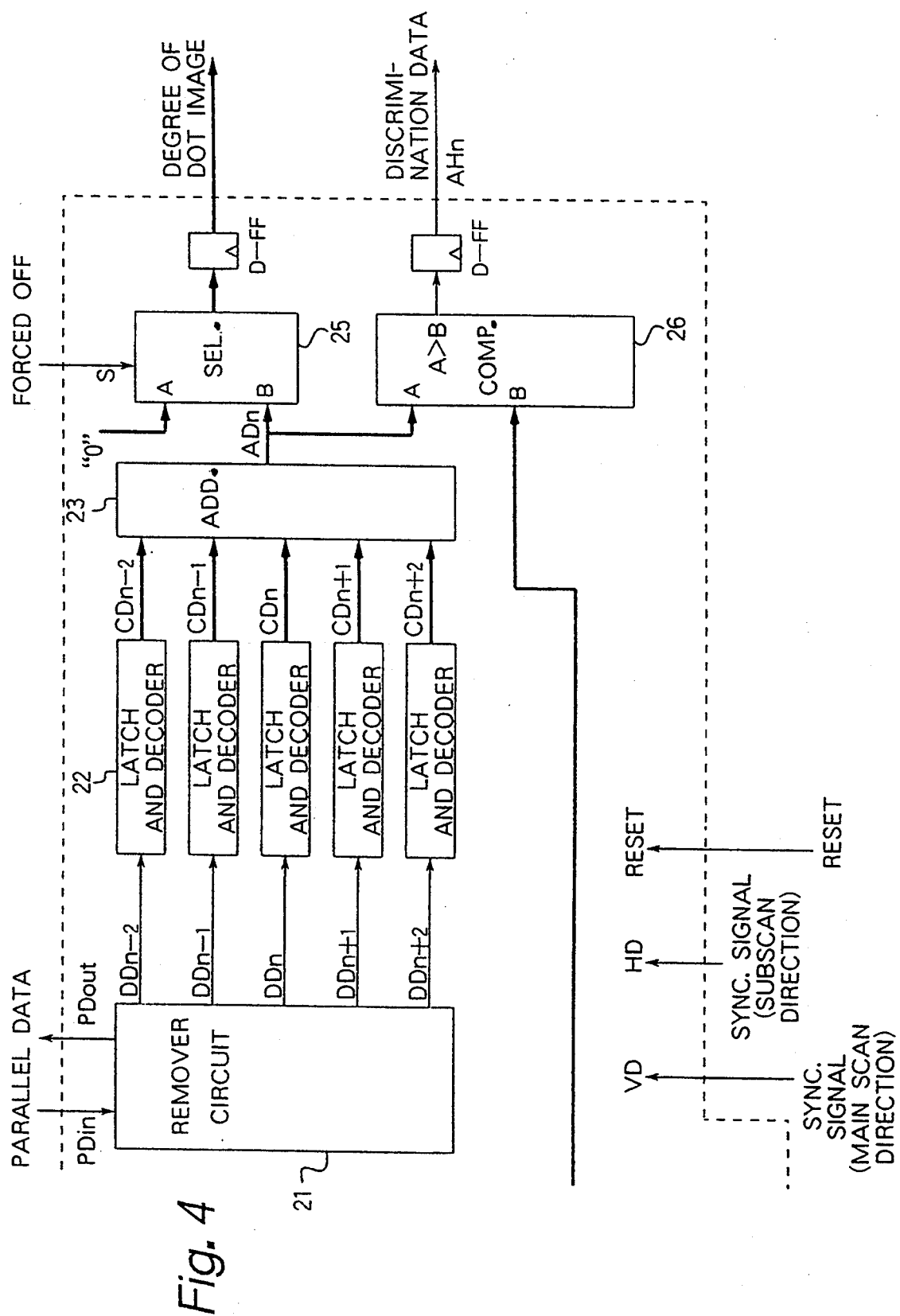
FIG. 4 is a block diagram of the other part of the dot area discriminator.

FIGS. 3 and 4 show an entire structure of the dot area discriminator 12. Digital image data received by the dot area discriminator 12 are density data obtained by the photoelectric conversion in the CCD sensor 9, the digitalization and shading correction in the A/D conversion and shading correction section 10 and the reflectivity to density conversion in the gamma transformation circuit 11. The digital image data of five successive dot lines are received, and each central pixel in a matrix of 15 * 5 pixels is decided to be a pixel in a dot area or not, and the result is sent to the MTF correction section 50. The size of the matrix for discrimination is determined according to the balance between the cost and the performance.

Before explaining the dot area discriminator 12, signals used in the circuit are explained. Signal "ID" denotes an image data signal expressed as gradation data (8 bits) of level 0 to 255 received by the dot area discriminator 12. Signal "$ID_n$" is the ID signal received by the dot area discriminator 12 at an n-th dot line from the origin (left topmost point of the image) in the subscan direction (in the Y axis direction). If necessary, data of each pixel in the main scan direction (in the X axis direction) in the n-th dot line is denoted as $ID_n(X)$. The "X" in the parenthesis means a value in the X axis direction, and the value of X changes from 0 to 255 for an image of 256 * 256 pixels.

Signal "$ED_n$" denotes a 1-bit maximum flag signal for each pixel in the n-th dot line obtained by a maximum detector 20. If the image density of an object pixel under processing is larger than a prescribed bias value BD (8-bit data received from an internal register 24), it is decided that the object pixel is decided as a maximum point and $ED_n$="1" is sent, otherwise $ED_n$="0" is sent.

Signal "MSIZE" is a 1-bit signal for deciding whether the image density of an object pixel is maximum for each three pixels or for each five pixels in maximum detectors 20. If MSIZE="1", three successive pixels in the same dot line are used for the decision. The middle pixel among the three is regarded as an object pixel of $ID_n(X)$, while pixels at both sides $ID_n(X+1)$ and $ID_n(X-1)$ are regarded as peripheral pixels. Then, the density data are compared to decide if the image density of the object pixel is a maximum or not. If MSIZE="0", five successive pixels in the same dot line are used for the decision. The middle pixel among the five is regarded as an object pixel $ID_n(X)$, while pixels next after the adjacent pixels or at both ends $ID_n(X+2)$ and $ID_n(X-2)$ are regarded as peripheral pixels. Then, the pixel data are compared to decide if the object pixel is a maximum point or not. Usually, MSIZE is set to be "1" (three pixels). However, MSIZE is set to be "0" if dot points of lower frequencies are needed to be discriminated.

Signal "B" is an 8-bit signal sent from the internal resister 24 to the maximum detectors 20, and it is used to decide a maximum points.

Signal "SD" is an 8-bit data signal used as a threshold value by a comparator 26 against the input number of maximum points in a pixel area of 15 * 5 pixels for discriminating if the central pixel is in a dot area or not.

Signal "MA" is a 3-bit system address signal, signal "MD" is an 8-bit system address data signal, signal "$\overline{CS}$" is a chip select signal, and signal "$\overline{WR}$" is a write/read signal. These signals generate the signals MSIZE, BD and SD in the internal register 24.

Signals "$PD_{in}$" and "$PD_{out}$" of 1-bit maximum flags are used when a plurality of dot area discriminators 12 is connected in parallel to each other, as will be explained later with reference to FIG. 8.

Signal "$DD_n$" is a 1-bit maximum flag signal obtained by removing continuous maximum points of $ED_n$ in the n-th dot line by the maximum remover 20.

Signal "$CD_n$" is a 4-bit data signal of a count of the number of the maxima for 15 pixels in the n-th dot line counted by a latch and decoder 22.

Signal "$AD_n$" is an 8-bit data signal of the sum of signals $CD_{n+2}$, $CD_{n+1}$, $CD_n$, $CD_{n-1}$ and $CD_{n+2}$ by an adder 23 or the number of maxima in a matrix of 15 * 5 pixels for dot area discrimination.

Forced off signal denotes a signal for invalidating the signal $AD_n$.

Further, VD and HD denote synchronization signals in the main scan direction and in the subscan direction in the raster scan, and a RESET signal denotes a reset signal of the circuit itself. These signals are received by the dot area discriminator 12.

Next, the circuit of the dot area discriminator 12 is explained below. Image data signals $ID_{n+2}$, $ID_{n+1}$, $ID_n$ and $ID_{n-1}$ of four successive dot lines are stored in four FIFO memories (line memories) 19 composed of delayed flip flops and supplied to the maximum detectors 20, while the image data $ID_{n-2}$ of the next dot line is supplied directly to the maximum detector 20. The image data signals of each line are processed in the maximum detectors 20 according to the signals MSIZE and BD supplied from the internal register 24 in the unit of pixel.

For example, when MSIZE="1", the image data signals $ID_n$ of the n-th dot line are processed as follows: If the differences of the value of the image data $ID_n(X)$ of the object pixel from that of the image data $ID_n(X-1)$, $ID_n(X+1)$ are both larger than a bias value set by the signal BD, a maximum flag signal $ED_n(X)$ is set as "1" because the object pixel is decided as a pixel in a dot area. Otherwise the maximum flag signal $ED_n(X)$ is set as "0".

In the remover circuit 21, if there are successive maximum points in the subscan direction, that is, if $ED_{n+2} = ED_{n+1} = ED_n =$ "1" on the same X coordinate value, they are decided to be a part of a character image and only $ED_{n+2}$ at the top in the X coordinate value is remained as a maximum point, while the others $ED_{n+1}$ and $ED_n$ are set as "0". Then, signals $DD_{n+2}$, $DD_{n+1}$, $DD_n$, $DD_{n-1}$ and $DD_{n-2}$ obtained by the removal are supplied to latch and decoders 22 shown in FIG. 4.

In the latch and decoders 22, the signals $DD_{n+2}$, $DD_{n+1}$, $DD_n$, $DD_{n-1}$ and $DD_{n-2}$ received from the remover circuit 21 are counted for each fifteen pixels, and the counts are supplied as signals $CD_{n+2}$, $CD_{n+1}$, $CD_n$, $CD_{n-1}$ and $CD_{n-2}$ to an adder 23.

In the adder 23, the values of the signals $CD_{n+2}$, $CD_{n+1}$, $CD_n$, $CD_{n-1}$ and $CD_{n-2}$ of five dot lines are summed to be supplies as the 8-bit signal $AD_n$ to a selector 25 and the comparator 26.

In the selector 25, if the forced off signal is not received, the $AD_n$ signal is sent to the MTF correction section 50 shown in FIG. 2 as the data on the degree of dot image (a multi-level BCD code data). If the degree of dot image is zero, the image in the image area under consideration is decided as a character image or a photograph image. With increase in the multi-level BCD code data, a probability that the image in the image area under consideration is a dot image increases. The result of the degree of dot image is used in the MTF correction section 50. For example, the edge emphasis can be suppressed according as the degree of dot image increases.

In the comparator 26, the signal $AD_n$ received from the adder 23 is compared with the threshold level signal SD received from the internal register 24. If the signal $AD_n$ is larger that the threshold level signal SD, the pixel located at the center in the 15 * 5 pixels is decided to be a pixel in a dot area, and the 1-bit discrimination data $AH_n=$"1" for discriminating the dot is sent to the MTF correction section 50. Otherwise the pixel located at the center is decided not to be a pixel in a dot image area, and $AH_n=$"0" is sent to the MTF correction section 50. In the MTF correction section 50, if $AH_n=$"1", the processing for dot image is performed, while if $AH_n=$"0", the processing for character image is performed.

Though the image data received by the dot area discriminator 12 is image density data (ID) in the present embodiment, reflectivity data signals before entering the gamma transformation circuit 11 (FIG. 2) may also be used. At least, it is necessary that the image signals used for the discrimination have to be image data signals before being subjected to the MTF correction and the bi-level quantization.

(c-3) Maximum Detector

Figure 5:
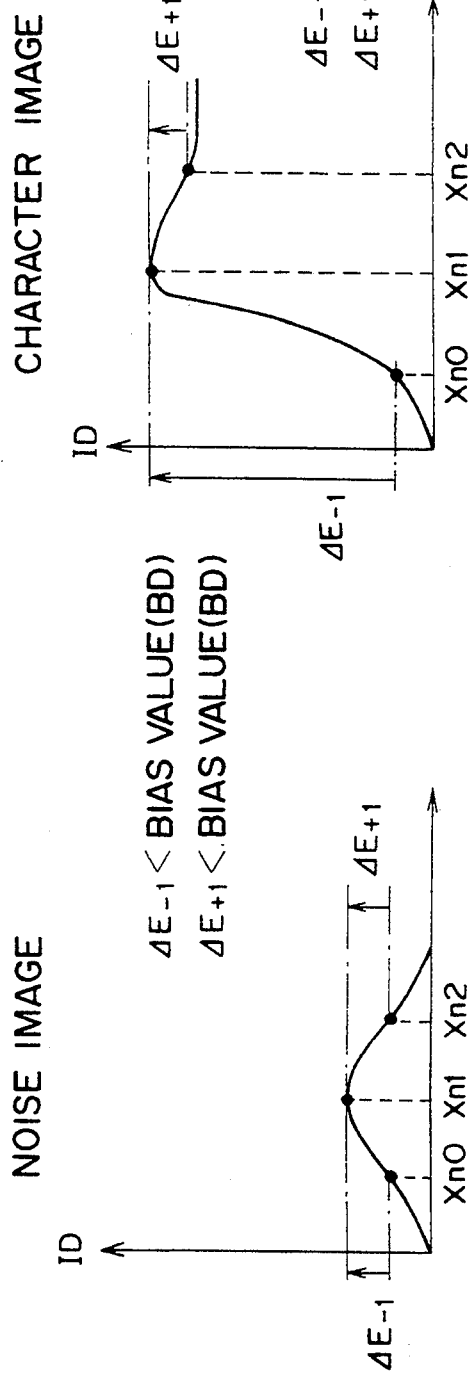
FIGS. 5(a), (b), (c) and (d) are diagrams for illustrating a general relation of density data of a pixel under consideration and peripheral pixels around the pixel in a noise image, in a photograph image, in a character image and in a dot image, respectively.

FIGS. 5(a), (b), (c) and (d) illustrate general relations of density difference of an object pixel from peripheral pixels around the object pixel in a noise image, in a photograph image, in a character image and in a dot image, respectively. The shape of the curve of the density level of three successive pixels in the n-th dot line for a noise image shown in FIG. 5(a) is similar to that for a dot image shown in FIG. 5(d). That is, they have a maximum. However, it is a characteristic that the two density differences ($\Delta E_{-1}$, $\Delta E_{+1}$) of the object pixel from the two peripheral pixels in the noise image is much smaller that in the dot image. As shown in FIG. 5(b), the shape of a curve of a photograph image does not have a maximum in contrast to a dot image because the photograph image expresses an image with gradation of density level or the density level is continuous spatially. As shown in FIG. 5(c), the shape of a curve of a character image also does not have a maximum because a character is constructed by linear lines and curves or it is continuous spatially.

Therefore, by setting an appropriate bias value BD, an object pixel in a dot image can be discriminated to be in a dot image if the two density differences are larger than the bias value BD. In the maximum detector 20 to be explained below, the image density data of an object pixel is compared with those of two pixels adjacent to the pixels or next to the adjacent pixels on the basis of the above-mentioned first and second characteristics. If both differences are larger than the prescribed bias value, the object pixel is decided as a pixel included in a dot area, and the maximum flag signal $ED_n=$"1" is sent to the remover circuit 21.

Figure 6:
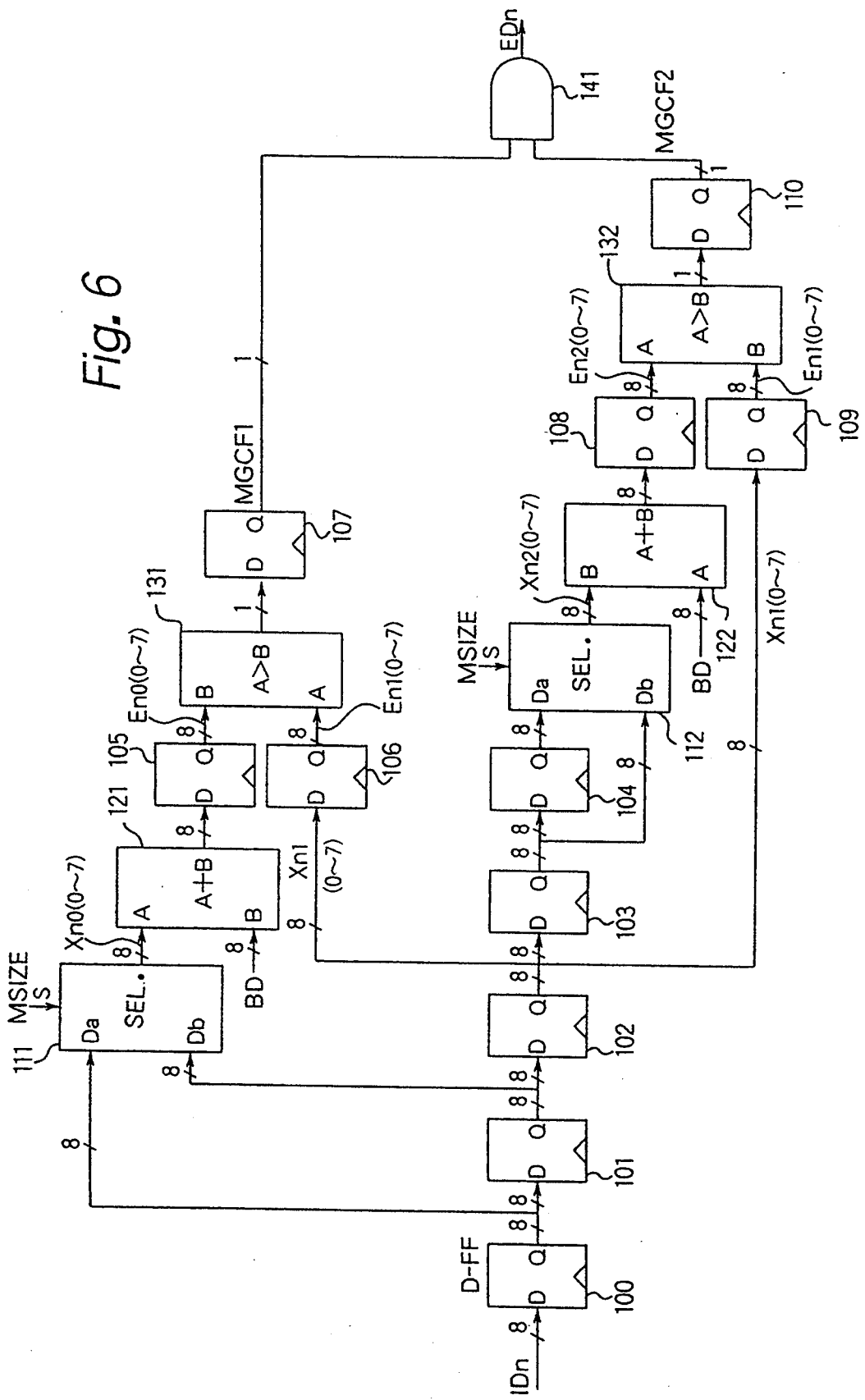
FIG. 6 is a circuit diagram of a maximum detector 20.

FIG. 6 shows a circuit diagram of the maximum detector 20 which consists of D flip flops (delay circuits) 100-110, selectors 111 and 112, adders 121 and 122, comparators 131 and 132 and an AND gate 141. Signals used in the circuit are explained first. The signal $ID_n$ denotes an 8-bit signal of each pixel data of 256 pixels of the n-th dot line in the main scan direction. As mentioned above, the data of each pixel of the n-th dot line in the main scan direction (in the X-axis direction) is expressed with addition of (X) such as $ID_n(X)$ if necessary. The value of X denotes a coordinate value in the main scan direction and it has a value between 0 to 255 for an image consisting of 256 * 256 pixels.

Signals "$X_{n0}$", "$X_{n1}$" and "$X_{n2}$" denote 8-bit signals of image data in the n-th dot line. The signal $X_{n0}$ denotes the image data $ID_n(X+1)$ or $ID_n(X+2)$ apart by one or two pixels after the object pixel in the dot line. The signal $X_{n1}$ denotes the image data $ID_n(X)$ of the object pixel, and it is compared with a sum of $X_{n0}$ and the bias value BD. The signal $X_{n2}$ denotes the image data $ID_n(X-1)$ or $ID_n(X-2)$ apart by one or two pixels before the object pixel in the dot line.

Signal "$E_{n0}$" denotes an 8-bit data signal obtained by adding the bias value BD to the image data $X_{n0}$. Signal "$E_{n1}$" denotes an 8-bit data signal having the value of the image data $X_{n1}$ of the object pixel. Signal "$E_{n2}$" denotes an 8-bit data signal obtained by adding the bias value BD to the image data $X_{n2}$.

Signal "MGCF1" is a 1-bit flag signal which is "1" when the signal $E_{n1}$ of the object pixel is larger than the signal $E_{n0}$ according to the comparison in a comparator 131, otherwise it is "0". Signal "MGCF2" is a 1-bit flag signal which is "1" when the signal $E_{n1}$ of the object pixel is larger than the signal $E_{n2}$ according to the comparison in another comparator 132.

The signal $ED_n$ is a 1-bit data of maximum detection flag obtained by multiplying the above-mentioned two flags MGCF1 and MGCF2. Only when the two flags are both "1" or when the object pixel is a maximum point, $ED_n$="1".

Next, the action of the maximum detector 20 is explained. Signals $ID_n$ are stored successively in the D flip flops 100-104. The selector 111 receives the image data stored in the D flip flops 100 and 101. If the signal MSIZE is "1" for three successive pixels, it sends an image data signal Db received via the D flip flop 101, as signal $X_{n0}$ otherwise it sends an image data signal Da received via the D flip flop 100, as signal $X_{n0}$. The adder 121 sums the signal $X_{n0}$ received from the selector 111 with the bias value BD and sends the sum as signal $E_{n0}$. The comparator 131 compares the signal $E_{n0}$ received from the D flip flop 105 with the signal $E_{n1}$ (=$X_{n1}$) of the object pixel received from the D flip flop 106, and sends MGCF1="1" or MGCF1="0" according as the signal $E_{n1}$ is larger or not.

The selector 112 receives the image data stored in the D flip flops 103 and 104. If the signal MSIZE is "1", it sends an image data signal Db received via the D flip flop 103, as signal $X_{n2}$, otherwise it sends an image data signal Da received via the D flip flop 104, as signal $X_{n2}$. The adder 122 receives the signal $X_{n2}$ from the selector 112 with the bias value BD and sends the sum as signal $E_{n2}$. The comparator 132 compares the signal $E_{n2}$ received from the D flip flop 108 with the signal $E_{n1}$ (=$X_{n1}$) of the object pixel received from the D flip flop 109, and sends MGCF2="1" or MGCF2="0" according as the signal $E_{n1}$ is larger or not.

Finally, a product of the signals MGCF1 and MGCF2 is obtained by the adder 141. If both MGCF1 and MGCF2 are "1", the object pixel is a maximum point, and the maximum detection flag $ED_n$="1" is sent to the remover circuit 21, otherwise $ED_n$="0" is sent.

The above-mentioned data processing is carried out for each pixel in the main scan direction in series, and the maximum detection flag $ED_n$ is output for each pixel. If $ED_n$="1" for a pixel of density level $ID_n(X)$, this means that the density level is larger by more than the prescribed value (BD) than that of the peripheral pixels of $ID_n(X-1)$ or $ID_n(X+1)$ if signal MSIZE="1". This corresponds to the relation of a pixel with its peripheral pixels as shown in FIG. 5(d) for a dot image. Thus, the pixel is decided to be a pixel in a dot area. On the other hand, a pixel of $ED_n$="0" is decided to be a pixel not in a dot area.

Figure 7:
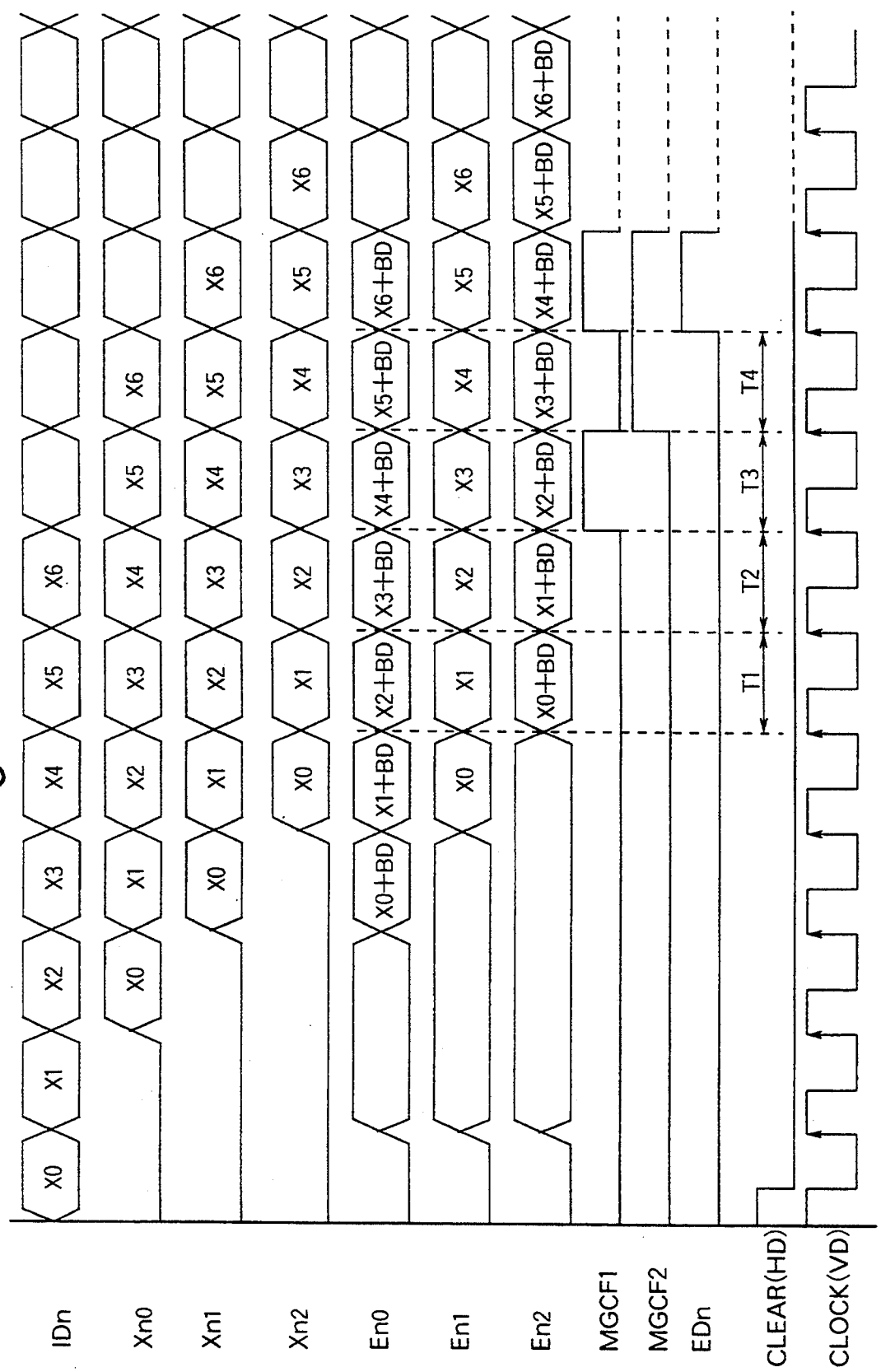
FIG. 7 is a timing chart of signals in the maximum detector when the signal MSIZE="1"

FIG. 7 shows a schematic example of a timing chart of signals in the maximum detector 20. This timing chart deals with a case of MSIZE="1" for three successive pixels. As will be understood easily with reference to FIG. 6, the signal $X_{n0}$ is sent via the two D flip flops 100 and 101 to the selector 111, and the timing is delayed by two clocks (VD) than the signal $ID_n$. Because the signal $X_{n1}$ is sent via the three D flip flops 100, 101 and 102, the timing is delayed by three clocks than the signal $ID_n$. Further, because the signal $X_{n2}$ is sent via the four D flip flops 100, 101, 102 and 103, the timing is delayed by four pixel clocks than the signal $ID_n$. The signals $E_{n0}$, $E_{n1}$ and $E_{n2}$ are sent via the D flip flop 105, via 106 or 109 and via 108, respectively, they are delayed by one pixel clock than the signal $X_{n0}$, than $X_{n1}$ and than $X_{n2}$, respectively. The signals MGCF1 and MGCF2 are delayed by one pixel clock via the D flip flop 107, 110 than the output signals of the comparator 131 and of the other one 132. The maximum flag $ED_n$ is synchronous with the flags MGCF1 and MGCF2.

In a period T1 displayed in FIG. 7, the signals $E_{n0}$, $E_{n1}$ and $E_{n2}$ are compared by the comparators 131 and 132. In a period following the period T1, the signals MGCF1 and MGCF2 are both "0", and the object pixel is decided to be a pixel in a noise image (refer FIG. 5(a)). In periods following the periods T2 and T3, one of the signals MGCF1 and MGCF2 is "1", and the object pixel is decided to be a pixel in a photograph image or in a character image (refer FIGS. 5(b) and (c)). In a period following the period T4, the signals MGCF1 and MGCF2 are both "1", and the object pixel is decided to be a pixel in a dot image (refer FIG. 5(d)).

(c-4) Remover Circuit

Next, the remover circuit 21 for removing continuous maximum points in the subscan direction is explained below in detail. A character image including lines extending in the subscan direction has a maximum point in the main scan direction while it may have continuous maximum points in the subscan direction. The remover circuit 21 distinguishes such a maximum point of a character image from that of a dot image simply and fast, without providing further maximum detectors for the subscan direction. That is, if pixels decided to be a maximum point continue in the subscan direction or in the Y axis direction, the remover circuit 21 decides that these pixels are a part of a character such as a numerical character "1" having a line extending in the subscan direction, and it changes the maximum flags $ED_n$ to "0" except the first one in the subscan direction in order to reduce the number of the maximum points and to count the number of discrete maximum points.

Figure 8:
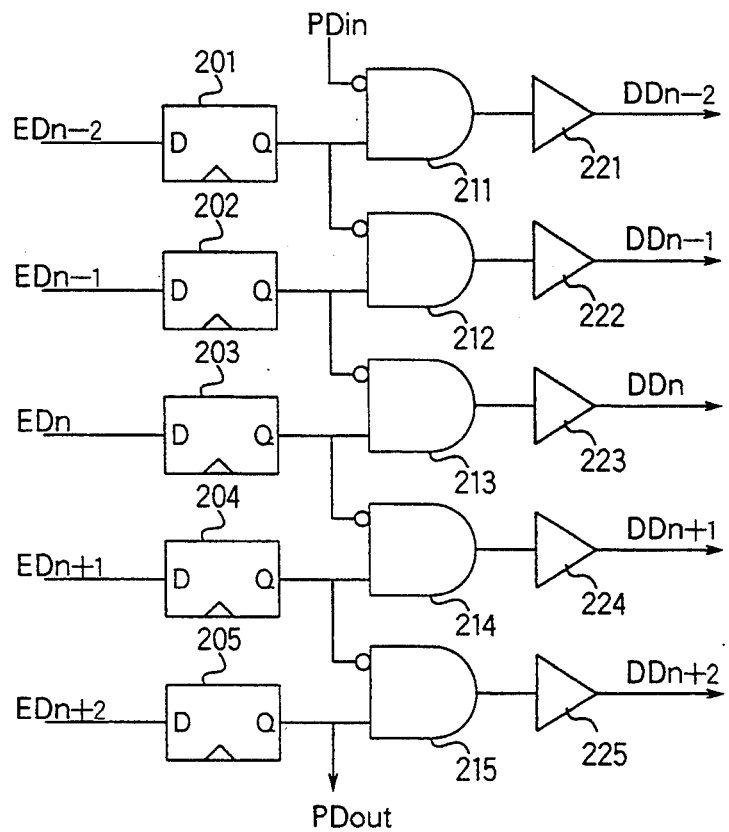
FIG. 8 is a circuit diagram of a remover circuit.

FIG. 8 illustrates the remover circuit 21 which consists of D flip flops 201-205, AND gates having inverters at one of the two inputs or inhibit gates 211-215 and buffers 221-225 connected in series to the inhibit gates. An inhibit gate 211-215 for a dot line receives an input signal for the dot line and another input signal at the inverter for a preceding dot line from an adjacent inhibit gate.

If a plurality of the dot area discriminator 12 is provided to be connected in parallel to each other, two parallel data $PD_{in}$ and $PD_{out}$ are used for the connection. A parallel data $PD_{in}$ which is the data signal $ED_{n+2}$ of a pixel in the fifth line is received from another external remover circuit 12 for preceding dot lines. If the remover circuit 20 is not connected to the external remover circuit, the data $PD_{in}$ is always "0". On the other hand, a parallel data $PD_{out}$ has a value of the signal $ED_{n-2}$ is sent to another external remover circuit for the following lines.

The signals $ED_n$ of five lines are sent via the D flip flops 201-205 to the inhibit gates 211-215 in parallel. For example, the inhibit gate outputs "1" when one input $ED_n=$"1" and the other input $ED_{n-1}=$"0". On the other hand, the inhibit gate outputs "0" when both input signals are "1". That is, when two successive dot lines have maximum points at the same position in the main scan direction, the maximum point of the second dot line of the two dot lines is removed or invalidated.

received by the decoder 515 to be decoded to a 4-bit BCD signal $CD_n$, as displayed in Table 2. Five latch and decoders 22 for the five dot lines are used as shown in FIG. 4, and five signals $CD_{n+2}$, $CD_{n+1}$, $CD_n$, $CD_{n-1}$ and $CD_{n-2}$ are sent to the adder 23.

The adder 23 sums the five signals as an 8-bit data $AD_n$ to be sent to the selector 25 and to the comparator 26. The selector 25 sends the sum as a data on the degree of dot image to the MTF correction section 50 if the forced off signal is not received. The comparator 26 compares the sum with a threshold value SD received from the internal register 24, and if the sum exceeds the threshold value SD, it sends a discrimination data $AH_n$ to the MTF correction section.

TABLE 2

| D0 | D1 | D2 | D3 | D4 | D5 | D6 | D7 | D8 | D9 | D10 | D11 | D12 | D13 | D14 | S0 | S1 | S2 | S3 |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 0 | 0 | 0 | 0 | 0 | 1 | 0 | 0 | 0 |
| 1 | 1 | 0 | 0 | 0 | 0 | 0 | 0 | 0 | 0 | 0 | 0 | 0 | 0 | 0 | 0 | 1 | 0 | 0 |
| 0 | 0 | 1 | 0 | 0 | 0 | 0 | 0 | 0 | 0 | 0 | 0 | 0 | 0 | 0 | 1 | 0 | 0 | 0 |
| . | | | | | | | | | | | | | | | | | | |
| . | | | | | | | | | | | | | | | | | | |
| . | | | | | | | | | | | | | | | | | | |
| 1 | 0 | 1 | 0 | 0 | 1 | 0 | 0 | 1 | 1 | 1 | 0 | 0 | 0 | 0 | 0 | 1 | 1 | 0 |
| 0 | 1 | 1 | 0 | 0 | 1 | 0 | 0 | 1 | 1 | 1 | 0 | 0 | 0 | 0 | 0 | 1 | 1 | 0 |
| 1 | 1 | 1 | 0 | 0 | 1 | 0 | 0 | 1 | 1 | 1 | 0 | 0 | 0 | 0 | 1 | 1 | 1 | 0 |
| 0 | 0 | 0 | 1 | 0 | 1 | 0 | 0 | 1 | 1 | 1 | 0 | 0 | 0 | 0 | 1 | 0 | 1 | 0 |
| . | | | | | | | | | | | | | | | | | | |
| . | | | | | | | | | | | | | | | | | | |
| . | | | | | | | | | | | | | | | | | | |
| 1 | 1 | 0 | 1 | 1 | 1 | 1 | 1 | 1 | 1 | 1 | | 1 | 1 | 1 | 0 | 1 | 1 | 1 |
| 0 | 0 | 1 | 1 | 1 | 1 | 1 | 1 | 1 | 1 | 1 | 1 | 1 | 1 | 1 | 1 | 0 | 1 | 1 |
| 1 | 0 | 1 | 1 | 1 | 1 | 1 | 1 | 1 | 1 | 1 | 1 | 1 | 1 | 1 | 0 | 1 | 1 | 1 |
| 0 | 1 | 1 | 1 | 1 | 1 | 1 | 1 | 1 | 1 | 1 | 1 | 1 | 1 | 1 | 0 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 |

In a modified example, if two lines have maximum points continuously, the maximum point in a third dot line after the two dot lines is invalidated.

FIG. 9 displays a timing chart of input signals $ED_n$ and output signals $DD_n$. It is clear that the output signal $DD_n$ are delayed by one pixel clock by the D flip flop (delay circuit) 201-205 than the input signals $ED_n$. For example, if $ED_{n+2}=$"1", $ED_{n+1}=$"0", $ED_n=$"1", $ED_{n-1}=$"0" and $ED_{n-2}=$"0", as in the period A in FIG. 9, there are no continuous maximum points in the subscan direction, so that $DD_{n+2}=$"1", $DD_{n+1}=$"0", $DD_n=$"1", $DD_{n-1}=$"0" and $DD_{n-2}=$"0". On the other hand, if $ED_{n+2}=$"1", $ED_{n+1}=$"1", $ED_n=$"1", $ED_{n-1}=$"0" and $ED_{n-2}=$"0", as in the period B in FIG. 9, there are continuous maximum points in the subscan direction in the first three dot lines, so that $DD_{n+2}=$"1", $DD_{n+1}=$"0", $DD_n=$"0", $DD_{n-1}=$"0" and $DD_{n-2}=$"0". That is, the values of $DD_{n+1}$ and $DD_n$ are changed to "0".

(c-5) Latch and Decoder, and Adder

Figure 10:
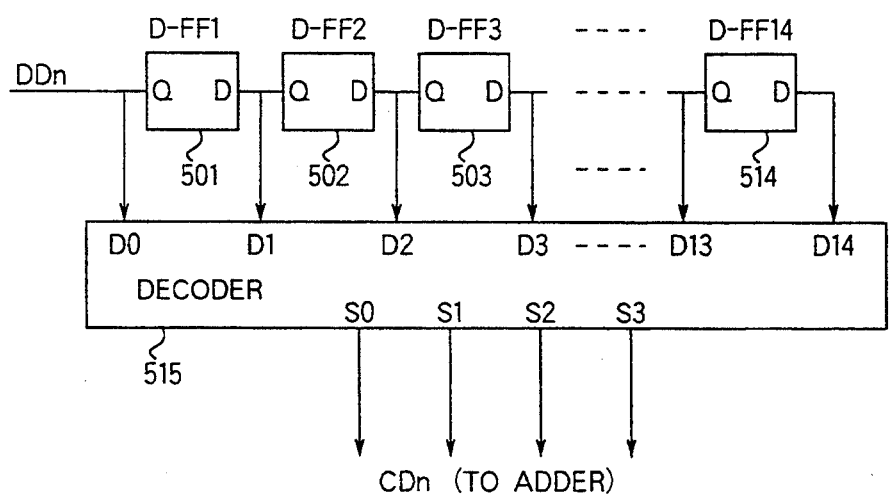
FIG. 10 is a circuit diagram of a latch and decoder.

FIG. 10 shows a circuit of one of the latch and decoders 22 which includes fourteen D flip flops (latches) 501-514 connected in series and a decoder 515. The input bi-level signals $DD_nS$ which represent maxima after the removal of continuous maxima are latched successively by the D flip flops 501-514. The input signal $D_O$ or $DD_n$ as received from the remover circuit 21 and the latched signals $D_1$-$D_{14}$ of the D flip flops 501 to 514 are

(c-6) Example of the Detection of the Degree of Dot Image

FIG. 11 illustrates examples of the discrimination of character and dot images by using the dot area discriminator 12 when the signal MSIZE is set to be "0" for five dot lines. As explained above with reference to FIGS. 3 and 4, the maximum detector 20 detects a maximum point first by comparing the density levels of five continuous pixels in the same dot line. That is, a middle pixel in the five of density level $ID_n(X)$ is taken as the object pixel, while two end pixels of level $ID_n(X+2)$, $ID_n(X-2)$ apart from the middle pixel by two pixels are taken as the peripheral pixels. The maximum detector 20 sends $ED_n=$"1" if the middle pixel is a maximum point, otherwise it sends $ED_n=$"0". Next, the remover circuit 22 detects if the maximum points detected by the maximum detectors 20 continue in the subscan direction. If maximum points continue in the subscan direction, they are decided to be a part of a character such as a number "1" having a line extending in the subscan direction, and the remover circuit 21 changes the maximum flag $ED_n$ for the maxima to "0" except the preceding maximum point and sends $DD_n=$"0". On the other hand, if the signal $ED_n=$"1", the $DD_n=$"1" when the maximum points are not continuous.

FIG. 11 illustrates two examples. An example of a character image of a part of a character "N" of 15 * 5 pixels is illustrated as (a). The values of maximum detection flags $ED_n$ (b) of each pixel of the character image displayed in (a) are obtained by the maximum detectors 20, and the number of flags or the number of the pixels of $ED_n$="1" is counted as 16 in this case. The detection flags $DD_n$ displayed in (c) are obtained by removing continuous points in the subscan direction by the remover circuit 21 from the $ED_n$ data, and the number of flags or the number of the pixels of $DD_n$="1" is reduced largely to 6.

On the other hand, another example of a dot image of 15 * 5 pixels is illustrated as (d) in FIG. 11. The values of maximum detection flags $ED_n$ shown in (e) of each pixel of the dot image are obtained by the maximum detectors 20, and the number of flags or the number of the pixels of $ED_n$="1" is counted as 29. The detection flags $DD_n$ shown in (f) are obtained by removing continuous points in the subscan direction by the remover circuit 21 from the $ED_n$ data, and the number of flags or the number of the pixels of $DD_n$="1" is reduced to 22.

As explained above, in the example of the character image (a), the number 16 of flags $ED_n$ decreases to 6 largely as shown in (c) after continuous maximum points are removed by the remover circuit 21. On the other hand, in the example of the dot image (d), the number 29 of flags $DD_n$ decreases only to 22 as shown in (f) even after continuous maximum points are removed by the remover circuit 21. Further, the final count 22 for the dot image is much larger than 6 for the character image. Therefore, an area of dot image can be discriminated clearly from an area of character image by using an appropriate threshold value SD (for example 16) for the comparator 26.

In the present embodiment, a pixel (maximum point) at which the density level changes more than a certain value between the object pixel and peripheral pixels is used as a change point. However, in a modified embodiment, a pixel at which the density level exceeds a prescribed value may be used as a change point.

In the present embodiment, continuous maximum points in the subscan direction are invalidated in order to discriminate a dot image from a character image having a line extending in the subscan direction. However, in a modified embodiment, the change points may be invalidated when they are aligned in a prescribed pattern or are aligned alternately in the subscan direction.

Further, the selector 18 in the bi-level quantization section 60 may also be controlled according to the discrimination data and the degree of dot image provided by the dot area discriminator 12.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A dot image discrimination circuit for discriminating a dot image in an area composed of many pixels which have levels corresponding to image density, said circuit comprising:

a sampling means for sampling a plurality of pixels including a central pixel in an area of a prescribed size around the central pixel;

a detection means for comparing the level of each pixel in the area sampled by said sampling means with the level of a pixel which is close thereto in a first direction and for detecting a prominent pixel having a level which has a more prominent value than the close pixel in the first direction;

an inspection means for inspecting for each prominent pixel if another prominent pixel is close thereto in a second direction perpendicular to the first direction and for ignoring the prominent pixel according to the inspection;

a count means for counting the prominent pixels excluding ignored prominent pixels; and a discrimination means for discriminating if the central pixel is a pixel in a dot area, according to the count value obtained by said count means.

2. The dot image discrimination circuit according to claim 1, wherein said detection means compares the level of said each pixel with that of a pixel preceding in the first direction and with that of a pixel following in the first direction and detects said prominent pixel if the level of said each pixel is larger than the levels of the preceding and following pixels by more than a prescribed value.

3. The dot image discrimination circuit according to claim 2, wherein said detection means compares the level of said each pixel with levels of pixels adjacent thereto in the first direction.

4. The dot image discrimination circuit according to claim 2, wherein said detection means compares the level of said each pixel with levels of pixels which are separated by one pixel therefrom in the first direction.

5. A method for discriminating a dot image in an area composed of many pixels which have levels corresponding to image density, said method comprising:

sampling a plurality of pixels including a central pixel in an area of a prescribed size around the central pixel;

comparing the level of each sampled pixel with those of pixels which are close thereto in a first direction;

detecting a prominent pixel having a level which has a more prominent value than the close pixels in the first direction in accordance with the comparison;

inspecting for each of the prominent pixels if another prominent pixel is close thereto;

ignoring a prominent pixel if another prominent pixel is close thereto in the second direction;

counting the prominent pixels excluding said ignored prominent pixels;

discriminating if the central pixel is a pixel in a dot area, according to the count value; and repeating the above-mentioned steps by successively changing the central pixel.

6. A dot image discrimination circuit for discriminating a dot image in an area composed of many pixels which have levels corresponding to image density said circuit comprising:

a sampling means for sampling a plurality of pixels including a central pixel, in an area of a prescribed size around the central pixel, said central pixel being changed successively in a first direction;

a detection means for comparing the level of each pixel in the area sampled by said sampling means with the level of a pixel which is close thereto in the first direction and for detecting a prominent pixel having a level which has a more prominent value than the close pixels in the first direction in accordance with the comparison;

an ignoring means for ignoring a prominent pixel if another prominent pixel is close thereto in a second direction perpendicular to the first direction;

a count means for counting the prominent pixels excluding the ignored pixels; and a detection means for deciding a characteristic of an image data processing on the central pixel according to the count value counted by said count means.

7. The dot image discrimination circuit according to claim 6, wherein said detection means compares the level of said each pixel with that of a pixel preceding in the first direction and with that of a pixel following in the first direction and detects said prominent pixel if the level of the pixel is larger than those of the preceding and following pixels by more than a prescribed value.

8. A method for discriminating a dot image in an area composed of many pixels which have levels corresponding to image density, said method comprising:

(a) a sampling means for sampling a plurality of pixels including a central pixel in an area of a prescribed size around the central pixel;

(b) comparing the level of each pixel in the area sampled by said sampling means with the level of a pixel which is close thereto in a first direction;

(c) detecting a prominent pixel having a level which has a more prominent value than the close pixel in the first direction according to the comparison;

(d) ignoring the prominent pixel if another prominent pixel is close thereto in a second direction perpendicular to the first direction;

(e) counting the prominent pixels excluding the ignored pixels;

(f) deciding a characteristic of an image data processing on the central pixel according to the count value; and (g) repeating the above-mentioned steps (a)-(f) by changing the central pixel successively in the first direction.

9. An image processor comprising a dot image discrimination circuit and an image correction circuit;

said dot image discrimination circuit comprising:

a sampling means for sampling image data of a plurality of pixels including a central pixel in an area of a prescribed size around the central pixel, said central pixel being changed successively in a first direction;

a detection means for comparing the level of image data of each pixel in the area sampled by said sampling means with the level of a pixel which is close thereto in the first direction and for detecting a prominent pixel having a level which has a more prominent value than the close pixels in the first direction according to the comparison;

an ignoring means for ignoring the prominent pixel if another prominent pixel is close thereto in a second direction perpendicular to the first direction; and a count means for counting the prominent pixels excluding the ignored pixels;

said image correction circuit comprising:

an edge emphasis means for emphasizing an edge of received image data and for outputting emphasized image data;

a smoothing means for smoothing received image data and for outputting smoothed image data; and a mixing means for mixing said emphasized image data supplied from said edge emphasis means and said smoothed image data supplied from said smoothing means;

wherein said mixing means determines a mixing ratio of the emphasized image data to the smoothed image data according to the count value counted by the count means.

10. A dot image discrimination circuit for discriminating a dot image in an area composed of many pixels which have levels corresponding to image density, said circuit comprising:

a detection means for comparing the level of each pixel with the level of neighboring pixels thereof in a first direction and for detecting a prominent pixel having a level which is more prominent than the neighboring pixels in the first direction according to the comparison;

an inspection means for inspecting for each of the prominent pixels whether the prominent pixel is next to another prominent pixel in a second direction perpendicular to the first direction;

a count means for counting the prominent pixels excluding the prominent pixels which are next to the another prominent pixel; and a discrimination means for discriminating the dot area according to the count value of said count means.

11. The dot image discrimination circuit according to claim 10, wherein said detection means compares the level of each said pixel with that of a pixel preceding in the first direction and with that of a pixel following in the first direction and detects said prominent pixel if the level of the pixel is larger than those of the preceding and following pixels by more than a prescribed value.

12. The dot image discrimination circuit according to claim 11, wherein said preceding and following pixels are respectively apart from the pixel to be compared in the first direction by a specified distance.

13. A method for discrimination a dot image in an area composed of many pixels which have levels corresponding to image density, said method comprising:

(a) comparing the level of each pixel with the level of neighboring pixels thereof in a first direction;

(b) detecting a prominent pixel having a level which is more prominent than the neighboring pixels in the first direction according to the comparison;

(c) inspecting for each of the prominent pixels whether the prominent pixel is next to another prominent pixel in a second direction perpendicular to the first direction;

(d) counting the prominent pixels excluding the prominent pixels which are next to the another prominent pixel; and (e) discriminating the dot area according to the count value.

14. An image data processor for processing image data composed of a matrix of pixels, said processor comprising:

means for comparing the density levels of an X-th pixel with those of $(X \pm A)$-th pixels in each of (n-1)-th, n-th and (n+1)-th lines in the matrix and for judging that the X-th pixel is a change point if the level of the X-th pixel is much larger than those of the $(X \pm A)$-th pixels, wherein "X" denotes a coordinate along the lines, and "n" and "A" denote natural numbers except zero;

a count means for counting the change point excluding a change point which is next to another change point in a direction perpendicular to the line; and a discrimination means for discriminating if an image is a dot image according to the count value of said count means.

15. The dot image discrimination circuit according to claim 14, wherein said "A: is "1".

16. A method for processing image data composed of a matrix of pixels, said method comprising the steps of:
   (a) comparing the density levels of an X-th pixel with those of (X±A)-th pixels in each of (n-1)-th, n-th and (n+1)-th lines in the matrix and judging the X-th pixel to be a change point if the level of the X-th pixel is much larger than those of the (X±A)-th pixels, wherein "X" denotes a coordinate along the lines, and "n" and "A" denote natural numbers except zero;
   (b) counting the change point excluding a change point which is next to another change point in a direction perpendicular to the lines; and
   (c) discriminating if the image is a dot image according to the count value.

* * * * *

UNITED STATES PATENT AND TRADEMARK OFFICE
CERTIFICATE OF CORRECTION

PATENT NO. : 5,341,227　　　　　　　　　　　　Page 1 of 2

DATED : August 23, 1994

INVENTOR(S) : Hideo Kumashiro

It is certified that error appears in the above-identified patent and that said Letters Patent is hereby corrected as shown below:

In Col. 2, line 5, change "charge" to -- change --.

In Col. 2, line 7, change "charge" to -- change --.

In Col. 4, line 4, change "hi-level" to -- bi-level --.

In Col. 4, line 55, change "hi-level" to --bi-level --.

In Col. 7, line 5, change "$CD_{n+2}$" (second occurrence) to -- $CD_{n-2}$ --.

In Col. 14, line 45 (Claim 5, line 13), after "thereto" insert -- in a second direction perpendicular to the first direction -- .

In Col. 14, line 59 (Claim 6, line 6), delete " , " (comma).

In Col. 15, line 6 (Claim 6, line 21), change "detection" to -- decision --.

UNITED STATES PATENT AND TRADEMARK OFFICE
CERTIFICATE OF CORRECTION

PATENT NO. : 5,341,227

DATED : August 23, 1994

INVENTOR(S) : Hideo Kumashiro

It is certified that error appears in the above-identified patent and that said Letters Patent is hereby corrected as shown below:

In Col. 16, line 37 (Claim 13, line 1), change "discrimination" to -- discriminating --.

In Col. 16, line 66 (Claim 14, line 12), change "point" to -- points --.

Signed and Sealed this

Sixth Day of December, 1994

Attest:

BRUCE LEHMAN

Attesting Officer

Commissioner of Patents and Trademarks